United States Patent [19]

Anderson et al.

[11] 4,324,488
[45] Apr. 13, 1982

[54] FLOATING EDGE-FOLLOWER BORDERED PAPER MASK

[75] Inventors: Richard D. Anderson, Maple Grove; Ronald B. Harvey; Randall C. Knudsen, both of Minneapolis; John A. Wedel, Crystal, all of Minn.

[73] Assignee: Pako Corporation, Minneapolis, Minn.

[21] Appl. No.: 151,131

[22] Filed: May 19, 1980

[51] Int. Cl.³ .............................................. G03B 27/58
[52] U.S. Cl. ........................................ 355/74; 226/18; 226/198; 242/76; 352/224
[58] Field of Search ............... 355/39, 40, 72, 74; 352/224; 242/72 R, 76; 226/18, 198

[56] References Cited

U.S. PATENT DOCUMENTS

| | | | |
|---|---|---|---|
| 3,732,010 | 5/1973 | Harter et al. | 355/74 X |
| 3,737,227 | 6/1973 | Harter et al. | 355/74 |
| 3,807,861 | 4/1974 | Nosco et al. | 355/74 X |

FOREIGN PATENT DOCUMENTS 884192 4/1943 France ................. 352/224

*Primary Examiner*—Richard A. Wintercorn
*Attorney, Agent, or Firm*—Kinney, Lange, Braddock, Westman and Fairbairn

[57] ABSTRACT

A paper mask produces even width borders on bordered photographic prints even if the unexposed photographic print paper is misaligned, angularly mistracking, or wandering through alignment through roll feeding, or if the width of the paper varies. The paper mask apparatus includes a base which is mounted on the paper deck of the printer and front and rear guides which are movably mounted to the base and have masking lips which overhang the longitudinal edges of the print paper. The front and rear guides are generally parallel to one another and are urged toward one another by bias springs. A separate masking frame of the desired print size is mounted to one of the two guides and moves with that guide to define transverse masking edges.

28 Claims, 7 Drawing Figures

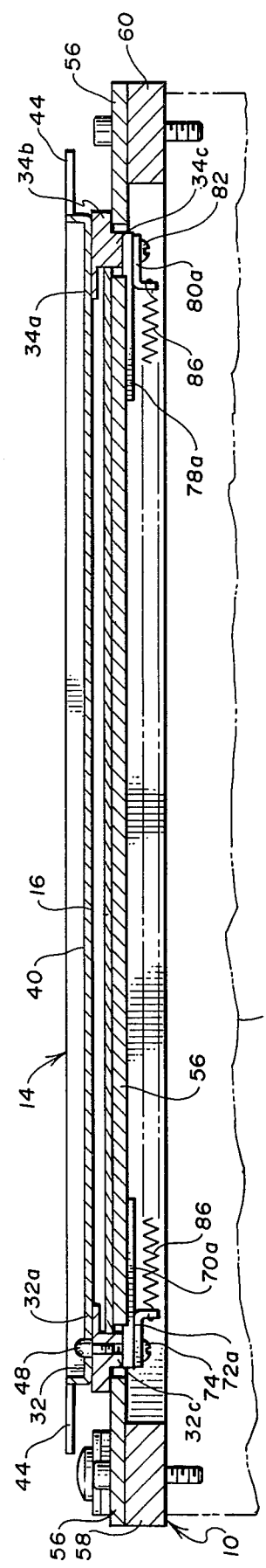
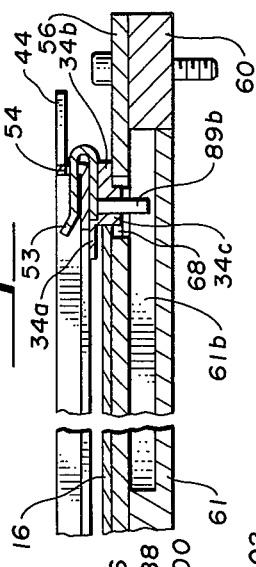
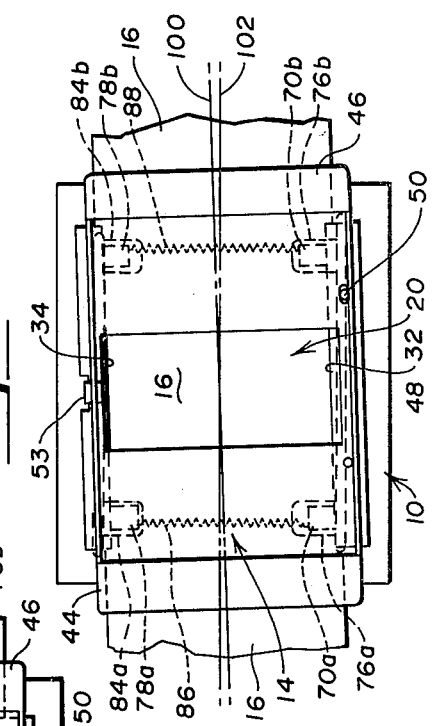
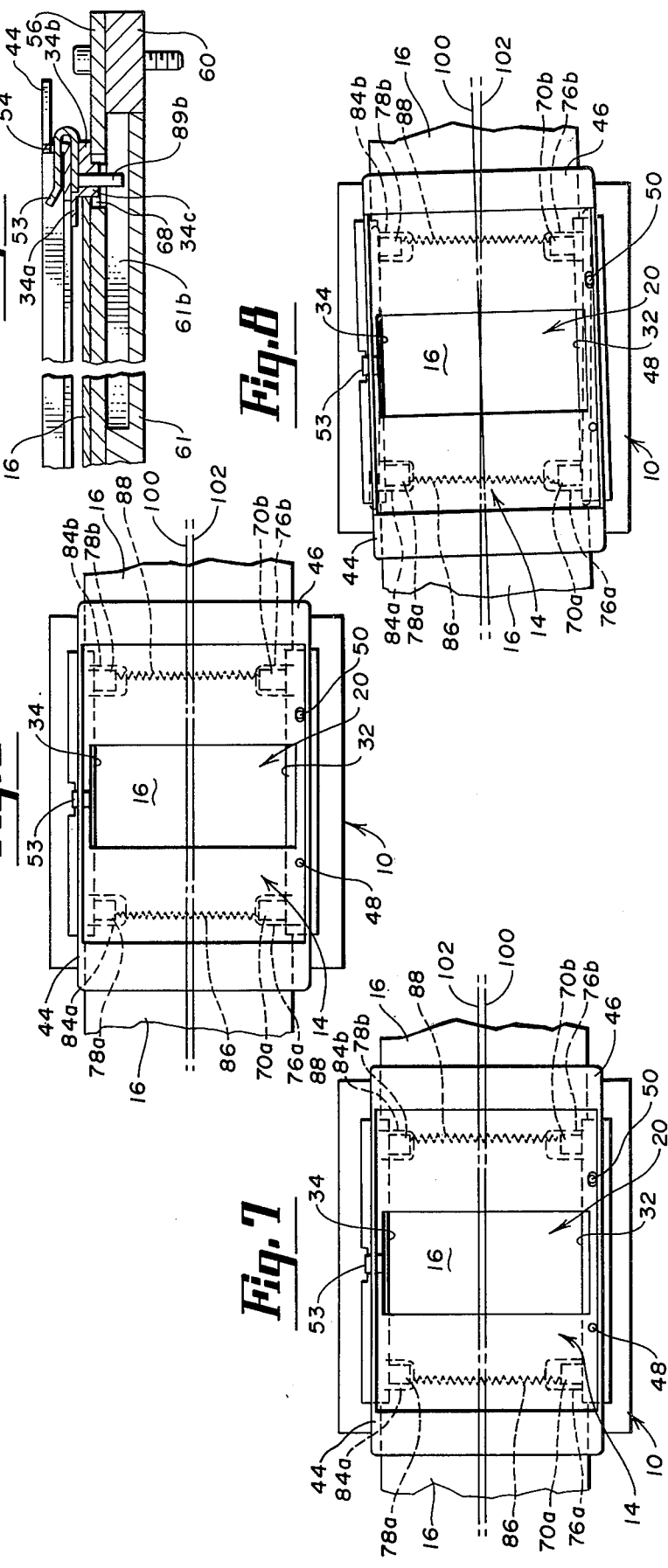

FLOATING EDGE-FOLLOWER BORDERED PAPER MASK

BACKGROUND OF THE INVENTION

1. Field of the Invention

The present invention relates to photographic printing apparatus. In particular, the present invention is an improved masking apparatus used in a photographic printer to create even width borders on bordered prints.

2. Description of the Prior Art

Photographic printers produce color or black-and-white prints from photographic film originals (generally negatives). High intensity light is passed through the film and imaged on the photosensitive print medium (generally photosensitive print paper). The photographic emulsion layers of the print paper are exposed and subsequently processed to produce a print of a scene contained in the film original.

Photographic prints are produced in a variety of different formats. One typical type of format used today is the "bordered" print in which a white border surrounds the printed image of the photographic print. This border is typically produced by a paper mask which is positioned between the photographic print paper and the optics of the printer which image light from the film original onto the paper. Bordered prints are produced by the use of a paper mask which defines an area of the print paper to be exposed to light which is smaller than the total area of the finished print. In this way, an unexposed border is produced around the exposed portion of the print paper. When developed, the unexposed portions of the print paper remain white, while the exposed portions of the print paper are darker or have a different color, depending upon the light to which they were exposed.

In typical photographic printers used in commercial photoprocessing operations, the unexposed photographic print paper is supplied from a supply roll, travels across a paper deck, and is wound onto a takeup roll. The paper mask is typically in close-spaced relationship to the paper deck, and the print paper advances through the space between the mask and the paper deck. The print paper is advanced across the paper deck and is stopped each time an exposure is made. In this manner, a large number of successive prints are made in edge-to-edge relationship on the strip of photographic print paper.

One difficulty which has been encountered with prior art photographic printers is that the widths and orientations of the white unexposed borders of bordered photographic prints vary in width and orientation. These variations arise from the fact that the paper mask in the prior art photographic printers is fixed in size and in position on the paper deck.

First, differences in width between the front and back borders occur if the centerline of the print paper is slightly misaligned with the centerline of the mask. In other words, the centerline of the paper strip is parallel to the centerline of the mask, but is shifted slightly toward either the front or the back. If the centerline of the paper is shifted toward the front with respect to the centerline of the mask, the front border is wider and the back border is narrower. Conversely, if the centerline of the paper is shifted to the back with respect to the centerline of the mask, the front border is narrower and the back border is wider. The paper misalignment typically occurs due to slight shifting of either the supply or takeup roll of photographic paper with respect to the centerline of the paper mask.

Second, variation in the width of the front and back borders can occur due to wander of the paper throughout feeding of the paper across the paper deck. In this case, the widths of the front and back borders of prints from the same roll of paper will vary.

Third, in some cases, the print paper can slightly angular mistrack across the deck. In other words, the centerline of the paper is skewed with respect to the centerline of the paper mask. In this case, the exposed area remains rectangular, but is skewed with respect to the edges of the print. All four borders of a skewed print are of differing width.

Fourth, variations in width of the print paper due to cutting tolerances and dimensional changes caused by humidity or other environmental conditions also cause variation in border widths of bordered prints. Since the mask is fixed with respect to the paper deck, the wider the print paper, the wider the front and back borders.

Uneven or skewed borders detract from the appearance of the photographic prints. This is a source of customer irritation or dissatisfaction.

SUMMARY OF THE INVENTION

The present invention is an improved masking apparatus for providing even width front and back borders on photographic prints. The apparatus of the present invention includes a base which is adapted to be mounted on a paper deck of a photographic printer. Movably mounted to the base are front and back guides. The front guide has a longitudinal front guiding edge for guiding the front longitudinal edge of the print paper, and has an overhanging masking lip having a masking edge parallel to the front guiding edge. Similarly, the rear guide has a longitudinal rear guiding edge for guiding a rear longitudinal edge of the photographic print paper, and has an overhanging masking lip having a masking edge parallel to the rear guiding edge. The front and rear guides are yieldably urged toward one another to follow automatically the edges of the print paper, and thereby compensate for misalignment, wander, angular mistracking, and width variations of the print paper.

The present invention also preferably includes a masking frame having first and second transverse masking edges. The masking frame is connected to one of the guides and moves with that guide to maintain generally square corners between the first and second transverse masking edges and the longitudinal masking edges. This permits proper orientation of the exposed portion of the print on the print paper even in the event of angular mistracking of the print paper across the paper deck.

BRIEF DESCRIPTION OF THE DRAWINGS

FIG. 4 is a sectional view along section 4—4 of FIG. 1.

FIG. 5 is a simplified plan view of the apparatus illustrating operation of the present invention when the photographic paper is displaced toward the rear.

FIG. 6 is a simplified plan view of the apparatus illustrating operation of the present invention when the photographic paper is displaced toward the front.

FIG. 7 is a simplified plan view of the apparatus illustrating operation of the present invention when the photographic paper is skewed.

DETAILED DESCRIPTION OF THE PREFERRED EMBODIMENTS

Figure 2:
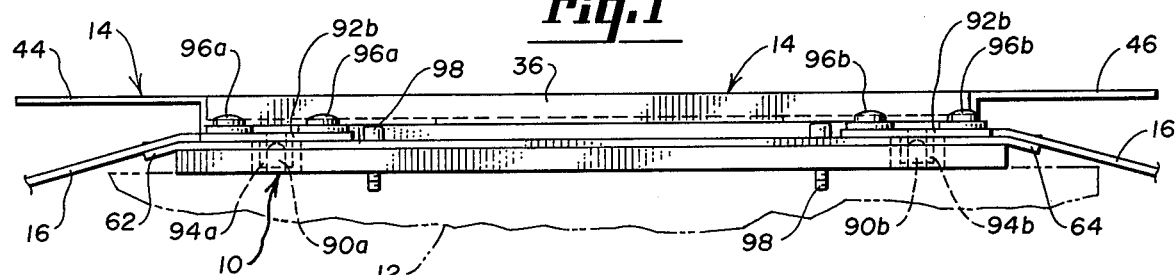
FIG. 2 is a front elevation of the photographic mask apparatus.
Figure 3:
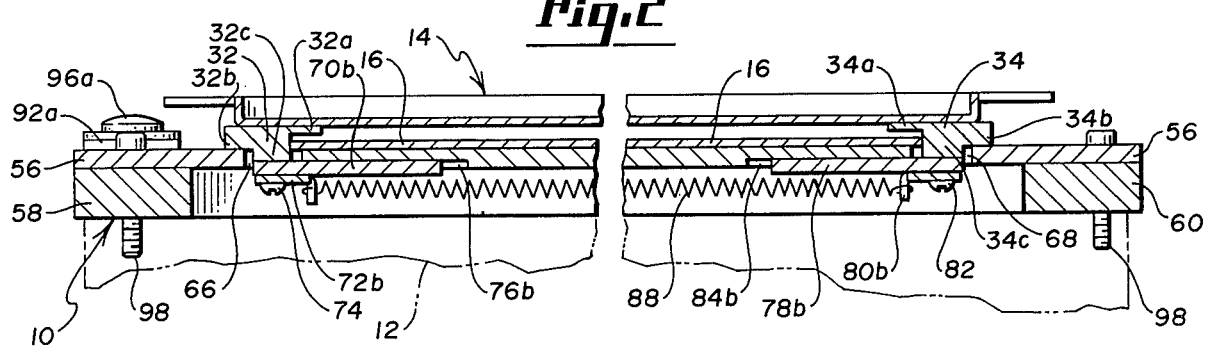
FIG. 3 is a sectional view along section 3—3 of FIG. 1.

The paper mask assembly of the present invention includes base 10 which is mounted on paper deck 12 (shown in phantom in FIGS. 2–4). Masking frame 14 is mounted over base 10, and photographic print paper 16 passes in the space between base 10 and frame 14.

Masking frame 14 includes a planar central plate 18 which overlies print paper 16. Located generally in the center of plate 18 is an aperture 20 which permits the print paper 16 to be exposed to light from the imaging optics of the photographic printer (not shown). Transverse masking edges 22 and 24 of plate 18 define the left and right edges of aperture 20. Edges 22 and 24 are generally transverse and orthogonal to the direction of paper travel, as indicated by arrow 26 in FIG. 1.

Edges 28 and 30, which define the front and rear edges of aperture 20, do not define, however, the front and rear masking edges of the exposed area of the photographic print paper 16. Instead, the front longitudinal masking edge is defined by front paper guide 32, which is movably connected to base 10, as will be described in detail later. Similarly, rear paper guide 34 defines the rear longitudinal masking edge. Like front guide 32, rear guide 34 is movably connected to base 10.

Masking frame 14 also includes upturned walls 36, 38, 40 and 42, and light flare shields 44 and 46. Light flare shield 44 is connected to and extends from wall 40, while light flare shield 46 is connected to and extends from wall 42. Light flare shields 44 and 46 prevent stray light from reaching photographic print paper 16 as it is being advanced from a supply reel (not shown) to the print mask assembly, or as paper 16 is being advanced from the print mask assembly toward a takeup reel (not shown).

Attached to front guide 32 are registration pins 48 and 50. Masking frame 14 is held in fixed position with respect to front guide 32 by registration pins 48 and 50, which extend through a generally circular hole 52a and an elongated slot 52b, respectively, in masking frame 14. The opposite side of masking frame 14 is held by a C-shaped hold-down 53, which extends through hole 54 in wall 38 of masking frame 14.

Masking frame 14, therefore, is held securely in position with respect to front guide 32, and moves with front guide 32. Hold-down 53 keeps masking frame 14 parallel to the plane of paper 16, while permitting a floating action of masking frame 14 with front guide 32 as front and rear guides 32 and 34 move.

Base 10 includes platen 56, which is supported by front and rear support bars 58 and 60 and cross bar 61. Platen 56 has guide flanges 62 and 64 at opposite ends for guiding print paper 16 onto and off from the top surface of platen 56.

Platen 56 has a pair of generally parallel front and rear guide mounting slots 66 and 68 within which front and rear guides 32 and 34 are movably mounted. As best shown in FIGS. 3 and 4, front guide 32 has a masking lip portion 32a which overhangs print paper 16, a platen overhanging lip 32b which overhangs platen 56, and a downward extending portion 32c which extends into front slot 66. Connected to downward extending portion 32 near opposite ends of front guide 32 are retaining tabs 70a and 70b and brackets 72a and 72b, which are connected to guide 32 by mounting screws 74.

Because the width of downward extending portion 32c of front guide 32 is less than the width of front slot 66, front guide 32 is movable in a direction transverse to the direction of paper travel to accommodate different paper orientations and paper widths. Retaining tabs 70a and 70b hold guide 32 in position with respect to platen 56 in a direction perpendicular to the plane of platen 56, while permitting movement of guide 32 in a plane parallel to the plane of platen 56. Retaining tabs 70a and 70b are movable within recessed portions 76a and 76b, respectively, on the lower surface of platen 56.

Rear guide 34 is mounted to platen 56 in a similar manner. Rear guide 34 includes a masking lip 34a which overhangs the print paper 16, a platen overhanging lip 34b, and a downward extending portion 34c, which extends into rear slot 68. Near opposite ends of guide 34, retaining tabs 78a and 78b and brackets 80a and 80b are connected to guide 34 by screws 82. Retaining tabs 78a and 78b are movable within recesses 84a and 84b, respectively, in the lower side of platen 56. Because the width of downward extending portion 34c of guide 34 is less than the width of rear slot 68, rear guide 34 is movable in a direction transverse to the direction of paper travel to accommodate different paper orientations and paper widths.

Guides 32 and 34 are spring biased toward one another by springs 86 and 88. Spring 86 extends between bracket 72a and bracket 80a, while spring 88 extends between bracket 72b and bracket 80b. Springs 86 and 88 cause guides 32 and 34 to be held against the edges of paper 16. Portion 32c of front guide 32 acts as a shoulder which is held in abutment with the front edge of paper 16 by the force of springs 86 and 88. Similarly, portion 34c of rear guide 34 is maintained in abutment with the rear edge of paper 16. Front masking lip 32a and rear masking lip 34a overhang the front and rear edges of paper 16 to define unexposed borders along the front and rear longitudinal edges of print paper 16. Because guides 32 and 34 are movable, the widths of the front and rear unexposed borders remain constant despite paper misalignment, paper wander, paper angular mistracking and paper width variation.

Springs 86 and 88 produce a force to tip lips 32b and 34b down against the platten 56. This provides a gap under lips 32a and 34a of adequate clearance to avoid paper emulsion scratching.

In a preferred embodiment of the present invention, front and rear guides 32 and 34 are a hardened metal such as hard-coat, anodized aluminum. This minimizes wear of guides 32 and 34 due to frictional contact with the front and rear edges of print paper 16.

Figure 1:
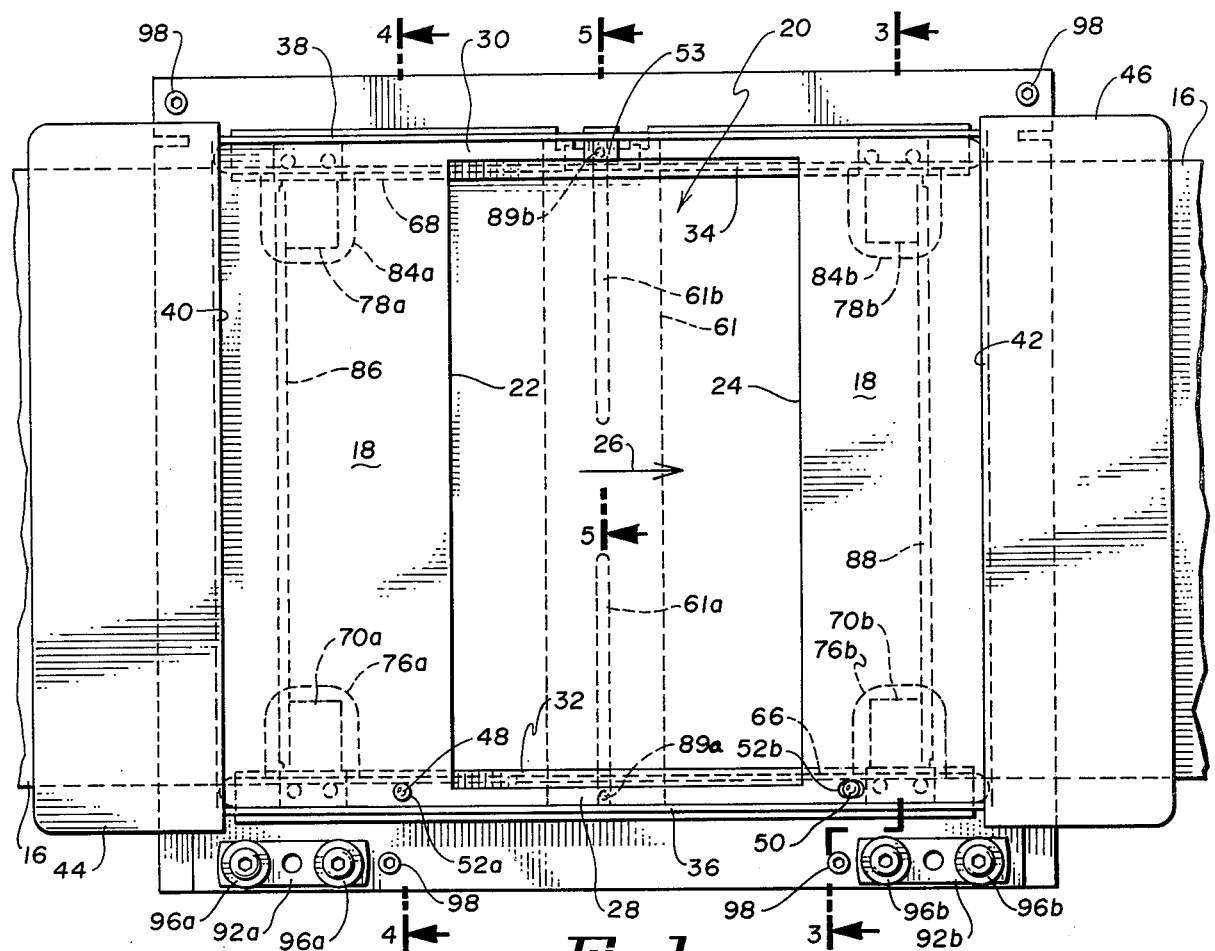
FIG. 1 is a top plan view of the photographic mask apparatus of the present invention.

As illustrated in FIGS. 1 and 5, cross bar 61 includes a pair of transverse slots 61a and 61b. Positioning pins 89a and 89b are connected to and extend downward from guides 32 and 34 into slots 61a and 61b, respectively. Pins 89a and 89b hold guides 32 and 34 in place along the longitudinal path and prevent guides 32 and 34 from being dragged along with the paper travel due to friction between paper 16 and guides 32 and 34. Pins 89a and 89b are preferably positioned proximate the centers of guides 32 and 34 to permit pivoting of guides 32 and 34 in the event of skewed paper travel.

In order to properly position the mask assembly of the present invention on paper deck 12, a pair of locator pins 90a and 90b are provided on the top surface of paper deck 12. A pair of mask locating devices 92a and 92b are attached to the mask assembly. Each device 92a or 92b includes a collar 94a (or 94b) which receives one of the locator pins 90a (or 90b). The position of collar 94a (or 94b) is adjustable to accommodate slightly different spacings of locator pins 90a or 90b, and to roughly center the entire mask assembly to within the floating range of paper position. Screws 96a (or 96b) normally hold collar 92a (or 92b) in position, and may be loosened to permit adjustment of the position of collar 92a (or 92b).

In addition, four leveling screws 98 are provided to ensure that base 10 is stably positioned so that their lower ends extend below the lower surfaces of support bars 58 and 60 and thus all four corners of base 10 are supported by paper deck 12.

FIGS. 6, 7 and 8 illustrate the operation of the mask assembly of the present invention in providing constant borders despite variations in paper alignment or orientation. In FIG. 6, the paper 16 is misaligned so that actual centerline 100 of paper travel is parallel to normal centerline 102 of paper travel, but is displaced toward the rear. In FIG. 7, the paper is misaligned toward the front, so that the actual centerline 100 is parallel too, but displaced to the front with respect to the normal centerline 102. In FIG. 8, paper 16 is exhibiting angular mistracking across the paper deck. As a result, actual centerline 100 is skewed with respect to normal centerline 102.

As shown in FIGS. 6, 7 and 8, the masking apparatus of the present invention provides constant width borders despite the misalignment or angular mistracking of paper 16. This is because guides 32 and 34 move with and follow paper 16 rather than being in fixed position with respect to paper deck 12 and base 10. Because the ends of guides 32 and 34 can move independently, proper orientation of the borders is achieved even in the case of angular mistracking as illustrated in FIG. 8.

Because masking frame 14 is connected to and moves with front guide 32, square corners and consistent print length (between transverse masking edges 22 and 24) are achieved even in the case of angular mistracking of paper 16. Hold-down 53 keeps masking frame 14 in place, but permits movement of masking frame 14 independent of rear guide 34. Use of locating pins 48 and 50 and mating holes 52a and 52b provides consistent location of making frame 14 with respect to front guide 32.

In a preferred embodiment of the present invention, a set of interchangeable masking frames 14 are used to provide different print lengths for the same print and paper width. These interchangeable masks are easily mounted and removed, since the individual masking frames 14 are held only by hold-down 53 and locating pins 48 and 50. The individual masking frames 14 are preferably of lightweight metal to reduce friction with print paper 16.

In the preferred embodiments of the present invention, base 10 also is one of an interchangeable set of bases. Each base 10 is used with a particular width of print paper. The bases 10 are easily installed and removed from paper deck 12 of a printer, since they are held in position solely by locating pins 90a and 90b. Each different base 10 is used in conjunction with its own set of interchangeable masking frames 14.

In conclusion, the photographic paper mask apparatus of the present invention has significant advantages over the prior art fixed paper masks used in producing bordered prints. First, with the paper mask apparatus of the present invention, constant front and rear longitudinal borders are provided even in those cases where the paper is slightly misaligned from front to back, is skewed so that it is angularly mistracking across the deck, or is wandering. Second, paper mask apparatus of the present invention accommodates width variations in the paper which can occur due to cutting tolerances or dimensional changes caused by humidity or other environmental conditions. Third, masking frame 14 which is connected to one of the floating front and rear guides provides square corners and consistent length distance even when the print paper is angularly mistracking. Fourth, the apparatus is easily removable from the paper deck of the photographic printer, and installation is also very simple. As a result, changeover from one paper size or format to another can be achieved with minimum effort and time.

Although the present invention has been described with reference to preferred embodiments, workers skilled in the art will recognize that changes may be made in form and detail without departing from the spirit and scope of the invention.

What is claimed is:

1. For use in a photographic printer in which a photographic print paper web is sequentially advanced across a paper deck and photographic images are sequentially exposed thereon, apparatus for masking the photographic print web during exposure of the photographic images paper to create unexposed borders along first and second longitudinal edges of the print paper web, the apparatus comprising:
   a base adapted to be mounted on the paper deck of the photographic printer;
   a first guide movably mounted to the base and having a first guiding edge for engaging a first longitudinal edge of the photographic print paper web and having an overhanging masking lip with a first longitudinal masking edge parallel to the first guiding edge;
   a second guide having a second guiding edge for engaging a second longitudinal edge of the photographic print paper web and having an overhanging masking lip with a second longitudinal masking edge parallel to the second guiding edge; and
   means for yieldably urging the first and second guides toward one another to engage the first and second longitudinal edges, respectively, of the photographic print paper web and to maintain the first and second longitudinal masking edges in alignment with the first and second longitudinal edges of the print paper web, respectively, despite variation in transverse positions of the first and second longitudinal edges.

2. The apparatus of claim 1 wherein the means for yieldably urging comprises:
   first spring means connected between first ends of the first and second guides; and
   second spring means connected between second ends of the first and second guides.

3. The apparatus of claim 2 wherein the base has first and second guide mounting slots, and wherein the first guide is movably mounted in the first guide mounting slot and the second guide is movably mounted in the second guide mounting slot.

4. The apparatus of claim 3 wherein the first and second guides have portions extending into the first and second guide mounting slots, and wherein the portions of the first and second guides have a width which is less than the width of the first and second guide mounting slots.

5. The apparatus of claim 4 and further comprising:
retaining means connected to the first and second guides.

6. The apparatus of claim 5 wherein the base has a first and a second major surface, and wherein the first and second guide mounting slots extend through the base from the first surface to the second surface, and wherein the print paper is supported on the first surface of the base.

7. The apparatus of claim 6 wherein the retaining means are positioned proximate the second surface of the base.

8. The apparatus of claim 7 and further comprising:
recess means in the second surface, and wherein the retaining means are movable in the recess means.

9. The apparatus of claim 8 wherein the retaining means comprise first and second retaining tabs connected to the first guide proximate its first and second ends, respectively, and third and fourth retaining tabs connected to its first and second ends, respectively.

10. The apparatus of claim 9 wherein the recess means comprise first, second, third and fourth recesses in the second surface for receiving the first, second, third and fourth retaining tabs, respectively.

11. The apparatus of claim 6 and further comprising:
first and second spring mounting means connected to the first guide proximate the first and second ends of the first guide, respectively; and
third and fourth spring mounting means connected to the second guide proximate the first and second ends of the second guide; and
wherein the first spring means extends between the first and third spring mounting means, and wherein the second spring means extends between the second and fourth spring mounting means.

12. The apparatus of claim 11 wherein the first and second spring means are mounted below the second surface of the base.

13. The apparatus of claim 1 and further comprising:
a masking frame having first and second transverse masking edges.

14. The apparatus of claim 13 wherein the masking frame overlies the base and the first and second guides and wherein the first and second transverse masking edges extend between the first and second longitudinal masking edges.

15. The apparatus of claim 14 and further comprising:
connecting means for connecting the masking frame to the first guide with the transverse masking edges being oriented generally perpendicular to the first longitudinal masking edge.

16. The apparatus of claim 15 wherein the connecting means fixedly connects the masking frame to the first guide.

17. The apparatus of claim 16 wherein the connecting means comprises:
registration pin means connected to the first guide; and
registration hole means in the masking frame for cooperating with the registration pin means to hold the masking frame in fixed relation to the first guide.

18. The apparatus of claim 17 and further comprising slidable connection means for slidably connecting the masking frame proximate the second guide to permit slidable movement of the masking frame with respect to the second guide in a plane parallel to the print paper but preventing movement of the masking frame in a direction perpendicular to the print paper.

19. The apparatus of claim 17 and further comprising:
first and second light flare shields connected to the masking frame at first and second ends thereof.

20. The apparatus of claim 1 and further comprising:
transverse slot means in the base means;
first pin means connected to the first guide and extending into and movable in the transverse slot means; and
second pin means connected to the second guide and extending into and movable in the transverse slot means.

21. The apparatus of claim 20 wherein the first pin means is connected proximate the center of the first guide and the second pin means is connected proximate the center of the second guide.

22. The apparatus of claim 20 wherein the transverse slot means comprise a first transverse slot in which the first pin means is movable and a second transverse slot in which the second pin means is movable.

23. The apparatus of claim 20 wherein the transverse slot means and the first and second pin means permit movement of the first and second guides in a direction transverse to a direction of travel of the print paper, and restrict movement of the first and second guides in the direction of travel of the print paper.

24. The apparatus of claim 23 wherein the transverse slot means and the first pin means permit the first guide to pivot about an axis defined by the first pin means, and wherein the transverse slot means and the second pin means permit the second guide to pivot about an axis defined by the second pin means.

25. For use in a photographic printer in which a photographic print paper web is sequentially advanced along a path and photographic images are sequentially exposed thereon, apparatus for masking the photographic print paper web during the exposure of the photographic images to create unexposed borders along first and second longitudinal edges of the print paper web, the apparatus comprising:
movable first and second guides positioned to receive first and second longitudinal edges, respectively, of the print paper web, the first and second guides having overhanging masking lips for overhanging the print paper web to create unexposed borders along the first and second longitudinal edges of the print paper web; and
means for causing the first and second guides to follow the first and second longitudinal edges of the print paper web to maintain the widths of the unexposed borders substantially constant despite variation in transverse positions of the first and second longitudinal edges.

26. The apparatus of claim 25 and further comprising:
a masking frame having first and second transverse masking edges.

27. The apparatus of claim 26 wherein the masking frame overlays the movable first and second guides and wherein the first and second transverse masking edges extend between the first and second guides.

28. The apparatus of claim 25 wherein the masking frame is fixedly connected to the first guide to move with the first guide as the first print guide follows the first longitudinal edge of the print paper.

* * * * *